United States Patent
Erceg et al.

(10) Patent No.: US 8,600,423 B2
(45) Date of Patent: *Dec. 3, 2013

(54) METHOD AND APPARATUS FOR IMPROVING NOISE POWER ESTIMATE IN WCDMA NETWORK

(75) Inventors: Severine Erceg, Cardiff, CA (US); Vinko Erceg, Cardiff, CA (US); Mark Kent, Vista, CA (US); Uri M. Landau, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/756,332

(22) Filed: Apr. 8, 2010

(65) Prior Publication Data

US 2010/0265840 A1 Oct. 21, 2010

Related U.S. Application Data

(63) Continuation of application No. 11/422,689, filed on Jun. 7, 2006, now Pat. No. 7,907,961.

(51) Int. Cl.
*H04B 7/00* (2006.01)

(52) U.S. Cl.
USPC .......... 455/522; 455/63.1; 455/65; 455/67.13; 455/69; 455/442; 370/318

(58) Field of Classification Search
USPC .............. 455/65, 67.13, 63.1, 69, 442, 522; 370/318
See application file for complete search history.

(56) References Cited

U.S. PATENT DOCUMENTS

| 6,269,239 | B1 | 7/2001 | Hashem et al. |
| 6,343,218 | B1 | 1/2002 | Kaneda et al. |
| 6,633,552 | B1 | 10/2003 | Ling et al. |

(Continued)

FOREIGN PATENT DOCUMENTS

| EP | 1 317 078 A2 | 6/2003 |
| EP | 1 179 892 B1 | 4/2005 |

(Continued)

OTHER PUBLICATIONS

Extended European Search Report corresponding to European Patent Application Serial No. 08017040.0-2411, Munich, Germany, mailed on Dec. 16, 2008.

(Continued)

*Primary Examiner* — Raymond Dean
(74) *Attorney, Agent, or Firm* — Sterne, Kessler, Goldstein & Fox P.L.L.C.

(57) ABSTRACT

Method and apparatus for improving a noise power estimate in a wideband CDMA (WCDMA) network are disclosed and may include calculating a total noise power estimate for a downlink channel based on a plurality of control channel bits from a plurality of different types of control channels. The plurality of control channel bits may include at least two of: dedicated physical channel (DPCH) transmit power control (TPC) bits, DPCH pilot bits, and common pilot channel (CPICH) bits. A first noise power estimate may be calculated for the downlink channel based on a plurality of the DPCH TPC bits. A value of at least one of the plurality of DPCH TPC bits may not be known when the at least one of the plurality of DPCH TPC bits is received.

27 Claims, 10 Drawing Sheets

(56) References Cited

U.S. PATENT DOCUMENTS

| | | | |
|---|---|---|---|
| 6,914,932 | B1 | 7/2005 | Miya et al. |
| 6,983,166 | B2 | 1/2006 | Shiu et al. |
| 7,069,033 | B1 | 6/2006 | Moon et al. |
| 7,085,254 | B1 | 8/2006 | Yun et al. |
| 7,146,142 | B1 | 12/2006 | Raaf |
| 7,200,190 | B2 | 4/2007 | Malette et al. |
| 7,248,837 | B2 | 7/2007 | Woo |
| 7,336,733 | B2 | 2/2008 | Naito |
| 7,340,268 | B2 | 3/2008 | Oh et al. |
| 7,356,071 | B2 | 4/2008 | Li et al. |
| 7,484,136 | B2 | 1/2009 | Qiu |
| 7,532,664 | B2 * | 5/2009 | Rimini et al. ............... 375/150 |
| 7,570,967 | B2 | 8/2009 | Ronkainen |
| 7,706,827 | B2 | 4/2010 | Catreux-Erceg et al. |
| 7,730,381 | B2 | 6/2010 | Butala et al. |
| 7,809,395 | B2 | 10/2010 | Catreux-Erceg et al. |
| 7,894,507 | B2 | 2/2011 | Kent et al. |
| 7,907,961 | B2 * | 3/2011 | Catreux-Erceg et al. ..... 455/522 |
| 7,929,473 | B2 | 4/2011 | Willenegger et al. |
| 2002/0157101 | A1 * | 10/2002 | Schrader et al. ............... 725/64 |
| 2003/0125040 | A1 | 7/2003 | Walton et al. |
| 2005/0152279 | A1 | 7/2005 | Robertson et al. |
| 2007/0191045 | A1 | 8/2007 | Kent et al. |
| 2007/0191046 | A1 | 8/2007 | Catreux-Erceg et al. |
| 2011/0019727 | A1 | 1/2011 | Catreux-Erceg et al. |
| 2011/0164523 | A1 | 7/2011 | Catreux-Erceg et al. |

FOREIGN PATENT DOCUMENTS

| | | |
|---|---|---|
| EP | 1821423 | 8/2007 |
| KR | 20000056189 | 9/2000 |
| WO | WO 00/74291 A1 | 12/2000 |
| WO | WO 2005/002083 A1 | 1/2005 |

OTHER PUBLICATIONS

Office Action mailed Oct. 22, 2008, in U.S. Appl. No. 11/355,110, Catreux-Erceg et al., filed Feb. 15, 2006.
Office Action mailed May 28, 2009, in U.S. Appl. No. 11/355,110, Catreux-Erceg et al., filed Feb. 15, 2006.
Office Action mailed Nov. 30, 2009, in U.S. Appl. No. 11/355,110, Catreux-Erceg et al., filed Feb. 15, 2006.
Office Action mailed Oct. 22, 2008 in U.S. Appl. No. 11/355,222, Catreux-Erceg et al., filed Feb. 15, 2006 (now US Pat. No. 7,809,395).
Office Action mailed Mar. 23, 2009, in U.S. Appl. No. 11/355,222, Catreux-Erceg et al., filed Feb. 15, 2006 (now US Pat. No. 7,809,395).
Office Action mailed Dec. 1, 2009, in U.S. Appl. No. No. 11/355,222, Catreux-Erceg et al., filed Feb. 15, 2006 (now US Pat. No. 7,809,395).
Notice of Allowance mailed May 17, 2010, in U.S. Appl. No. 11/355,222, Catreux-Erceg et al., filed Feb. 15, 2006 (now US Pat. No. 7,809,395).
Office Action mailed Mar. 20, 2009, in U.S. Appl. No. 11/422,689, Catreux-Erceg et al., filed Jun. 7, 2006 (now US Pat. No. 7,907,961).
Notice of Allowance mailed Oct. 21, 2009, U.S. Appl. No. 11/422,689, Catreux-Erceg et al., filed Jun. 7, 2006 (now US Pat. No. 7,907,961).
Office Action mailed Apr. 1, 2010, in U.S. Appl. No. 11/422,689, Catreux-Erceg et al., filed Jun. 7, 2006 (now US Pat. No. 7,907,961).
Notice of Allowance mailed Jun. 14, 2010, in U.S. Appl. No. 11/422,689, Catreux-Ercg et al., filed Jun. 7, 2006 (now US Pat. No. 7,907,961).
Office Action mailed Jul. 6, 2012, in U.S. Appl. No. 12/897,972, Catreux-Erceg et al., filed Oct. 5, 2010.
Office Action mailed Jan. 23, 2013, in U.S. Appl. No. 12/897,972, Catreux-Erceg et al., filed Oct. 5, 2010.
Office Action mailed Feb. 21, 2013, in U.S. Appl. No. 13/048,288, Catreux-Erceg et al., filed Mar. 15, 2011.
Notice of Allowance mailed Apr. 29, 2013 in U.S. Appl. No. 12/897,972, Catreux-Erceg et al., filed Oct. 5, 2010.
Notice of Allowance mailed Aug. 9, 2013 for U.S. Appl. No. 12/897,972, filed Oct. 5, 2010; 9 pages.
Final Rejection mailed Sep. 11, 2013 for U.S. Appl. No. 13/048,288, filed Mar. 15, 2011; 11 pages.

* cited by examiner

METHOD AND APPARATUS FOR IMPROVING NOISE POWER ESTIMATE IN WCDMA NETWORK

CROSS-REFERENCE TO RELATED APPLICATIONS/INCORPORATION BY REFERENCE

This application is a continuation of U.S. patent application Ser. No. 11/422,689, filed Jun. 7, 2006, now U.S. Pat. No. 7,907,961, which in turn makes reference to:

U.S. patent application Ser. No. 11/355,110, filed on Feb. 15, 2006, now pending;

U.S. patent application Ser. No. 11/355,222, filed on Feb. 15, 2006, now U.S. Pat. No. 7,809,395;

U.S. patent application Ser. No. 11/355,109, filed on Feb. 15, 2006, now abandoned; and U.S. patent application Ser. No. 11/355,111, filed on Feb. 15, 2006, now U.S. Pat. No. 7,706,827.

FIELD OF THE INVENTION

Certain embodiments of the invention relate to wireless communication. More specifically, certain embodiments of the invention relate to a method and apparatus for improving a noise power estimate in a wideband CDMA (WCDMA) network.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

In the case of a WCDMA downlink, multiple access interference (MAI) may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths after despreading, causing MAI. The level of intra-cell interference depends strongly on the channel response. In nearly flat fading channels, the physical channels remain almost completely orthogonal and intra-cell interference does not have any significant impact on the receiver performance. Frequency selectivity is common for the channels in WCDMA networks.

Mobile networks allow users to access services while on the move, thereby giving end users freedom in terms of mobility. However, this freedom does bring uncertainties to mobile systems. The mobility of the end users causes dynamic variations both in the link quality and the interference level, sometimes requiring that a particular user change its serving base station. This process is known as handover (HO). Handover is the essential component for dealing with the mobility of end users. It guarantees the continuity of the wireless services when the mobile user moves across cellular boundaries.

WCDMA networks may allow a mobile handset to communicate with a multiple number of cell sites. This may take place, for example, for a soft-handoff from one cell site to another. Soft-handoffs may involve cell sites that use the same frequency bandwidth. On occasions, there may be handoffs from one cell site to another where the two cell sites use different frequencies. In these cases, the mobile handset may need to tune to the frequency of the new cell site. Additional circuitry may be required to handle communication over a second frequency of the second cell site while still using the first frequency for communicating with the first cell site. The additional circuitry may be an undesirable extra cost for the mobile handset. In addition, the mobile handset may require different transmit power to establish and maintain a communication link with the new cell site. In a handoff scenario, the mobile handset may still be receiving a strong signal from the current cell site and a weaker signal from the new cell site. In this regard, transmit power may have to be adjusted so that the handoff may be achieved and the mobile handset may begin to communicate with the new cell site.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus for improving a noise power estimate in a wideband CDMA (WCDMA) network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and apparatus for improving a noise power estimate in a wideband CDMA (WCDMA) network, and may include calculating a total noise power estimate for a downlink channel based on a plurality of control channel bits from a plurality of different types of control channels. The plurality of control channel bits may comprise at least two of: dedicated physical channel (DPCH) transmit power control (TPC) bits, DPCH pilot bits, and common pilot channel (CPICH) bits. A first noise power estimate may be calculated for the downlink channel based on a plurality of the DPCH TPC bits. A value of at least one of the plurality of DPCH TPC bits may not be known when the at least one of the plurality of DPCH TPC bits is received. A second noise power estimate may be calculated for the downlink channel based on a plurality of the DPCH pilot bits. The total noise power estimate may be calculated for the downlink channel based on the calculated first noise power estimate and the calculated second noise power estimate.

The generated I component and Q component may be subtracted to determine the first noise power estimate for the downlink channel. The subtracted I component and the generated Q component may be squared to determine the first noise power estimate for the downlink channel. A third noise power estimate may be calculated for the downlink channel based on a plurality of the CPICH bits. The total noise power estimate may be calculated for the downlink channel based on the calculated first noise power estimate, the calculated second noise power estimate, and the calculated third noise power estimate. 13. A mean of the plurality of DPCH pilot bits that are received via the downlink channel may be calculated to yield a mean square estimate. A mean of a power of the plurality of DPCH pilot bits that are received via the downlink channel may be calculated to yield a mean power estimate. The mean square estimate may be subtracted from the mean power estimate to determine the second noise power estimate for the downlink channel.

Figure 1A:
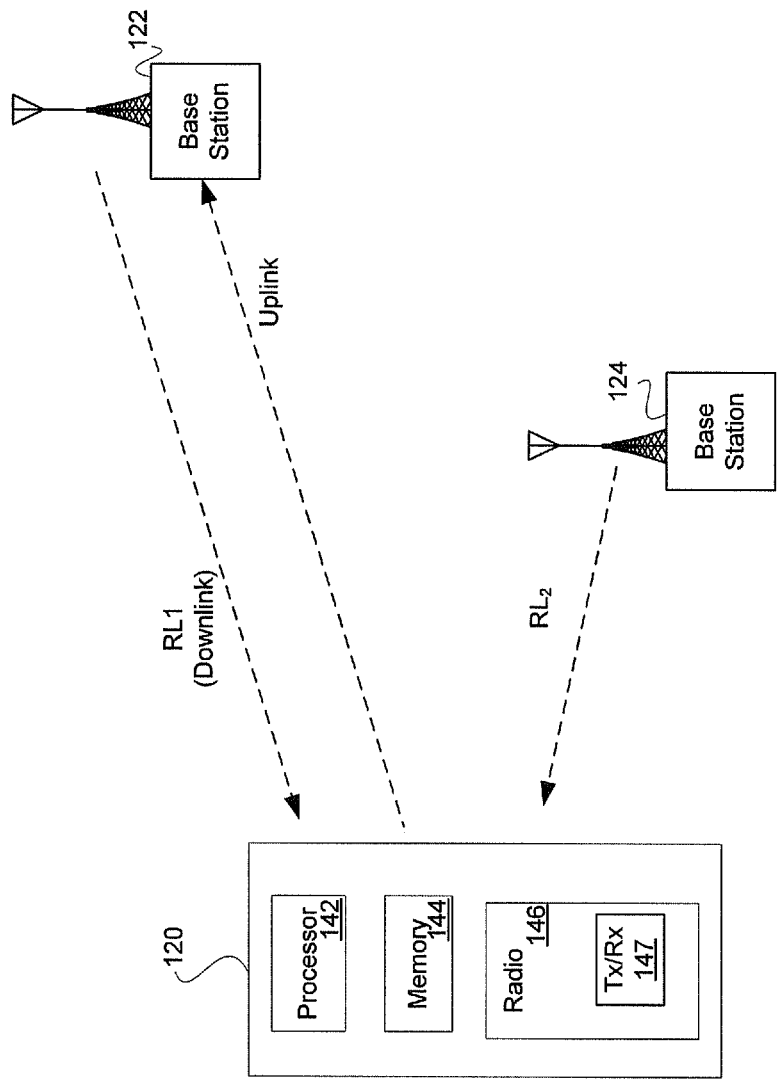
FIG. 1A is an exemplary diagram illustrating a WCDMA handset communicating with two WCDMA base stations, in accordance with an embodiment of the invention.

FIG. 1A is an exemplary diagram illustrating a WCDMA handset communicating with two WCDMA base stations, in accordance with an embodiment of the invention. Referring to FIG. 1A, there is shown a mobile handset or user equipment 120, a plurality of base stations BS 122 and BS 124, and a plurality of radio links (RL), $RL_1$ and $RL_2$ coupling the user equipment 120 with the base stations BS 122 and BS 124, respectively. The user equipment 120 may comprise a processor 142, a memory 144, and a radio 146. The radio 146 may comprise a transceiver (Tx/Rx) 147.

In accordance with an embodiment of the invention, methods for processing transmit power control (TPC) commands disclosed herein may apply to diversity and non-diversity wireless systems. Diversity wireless systems may comprise space-time transmit diversity (STTD), closed loop 1 (CL1), and closed loop 2 (CL2) wireless systems. In one embodiment of the invention, user equipment (UE) may be enabled to receive TPC commands transmitted on a downlink DPCH from one or more radio links. The received TPC commands may be combined in a weighted fashion, and a final TPC decision may be generated depending on whether to increase or decrease the user equipment transmit power. In this regard, a reliability factor may be determined for each of the received TPC commands based on a signal-to-noise ratio (SNR) measurement. The reliability factor may then be used to compute a weighted sum of the multiple received TPC commands, thereby yielding an accumulated TPC command. The sign of the accumulated TPC command may be used to determine whether to increase, decrease or maintain the transmit power.

Uplink power control (PC) is of paramount importance for CDMA-based systems because the capacity of such a system is a function of the interference level. The power transmitted by all active user equipments (UE) within a network may be controlled to limit interference levels and alleviate well-known problems such as the "near-far" effect. If there is more than one user active, the transmitted power of non-reference users is suppressed by a factor dependent on the partial cross-correlation between the code of the reference user and the code of the non-reference user. However, when a non-reference user is closer to the receiver than the reference user, it is possible that the interference caused by this non-reference user has more power than the reference user also referred to as the "near-far" effect. There are two types of power-control techniques. Open-loop power-control where each user equipment measures its received signal power and adjusts its transmit power accordingly and closed-loop power-control where an active radio link (RL) measures the received signal power from all user equipments and simultaneously commands the individual user equipments to raise or lower their transmit uplink power such that the received signal-to-noise ratio (SNR) from all user equipments at the radio links is the same.

The processor 142 may communicate and/or control a plurality of bits to/from the base stations BS 122 and BS 124. The memory 144 may comprise suitable logic, circuitry, and/or code that may store data and/or control information. The radio 146 may comprise transmit circuitry and/or receive circuitry that may be enabled to calculate a signal-to-noise ratio (SNR) and/or a noise power estimate of a downlink dedicated physical channel (DPCH) based on a plurality of transmit power control (TPC) bits and/or a plurality of dedicated pilot bits received via the downlink dedicated physical channel (DPCH), where the plurality of TPC bits may not be known when they are received. The radio links that belong to the same radio link set may broadcast the same values of transmit power control (TPC) bits. The radio links that belong to different radio link sets may broadcast different TPC bits. The user equipment 120 may receive TPC bits via multiple radio links, for example, $RL_1$ and $RL_2$ simultaneously. In a handover situation, the user equipment 120 may simultaneously receive signals from multiple radio link sets.

The WCDMA specification defines the physical random access channel (PRACH) for mobile phone uplinks and the acquisition indicator channel (AICH) for BTS downlinks. Communication is established when the user equipment 120 completes its search for a base station, for example, BS 122 and synchronizes its PRACH uplink signal with the BTS AICH downlink signal. When operating properly, the base station recognizes a PRACH preamble from the user equipment 120 and responds with an AICH to establish a communication link. The user equipment 120 may use the PRACH to transmit its setting of its open loop power control to the base station 122. Incorrect data in the PRACH preamble or problems with the signal quality may cause missed connections, disrupt the capacity of the cell or prevent response from the base station 122.

Figure 1B:
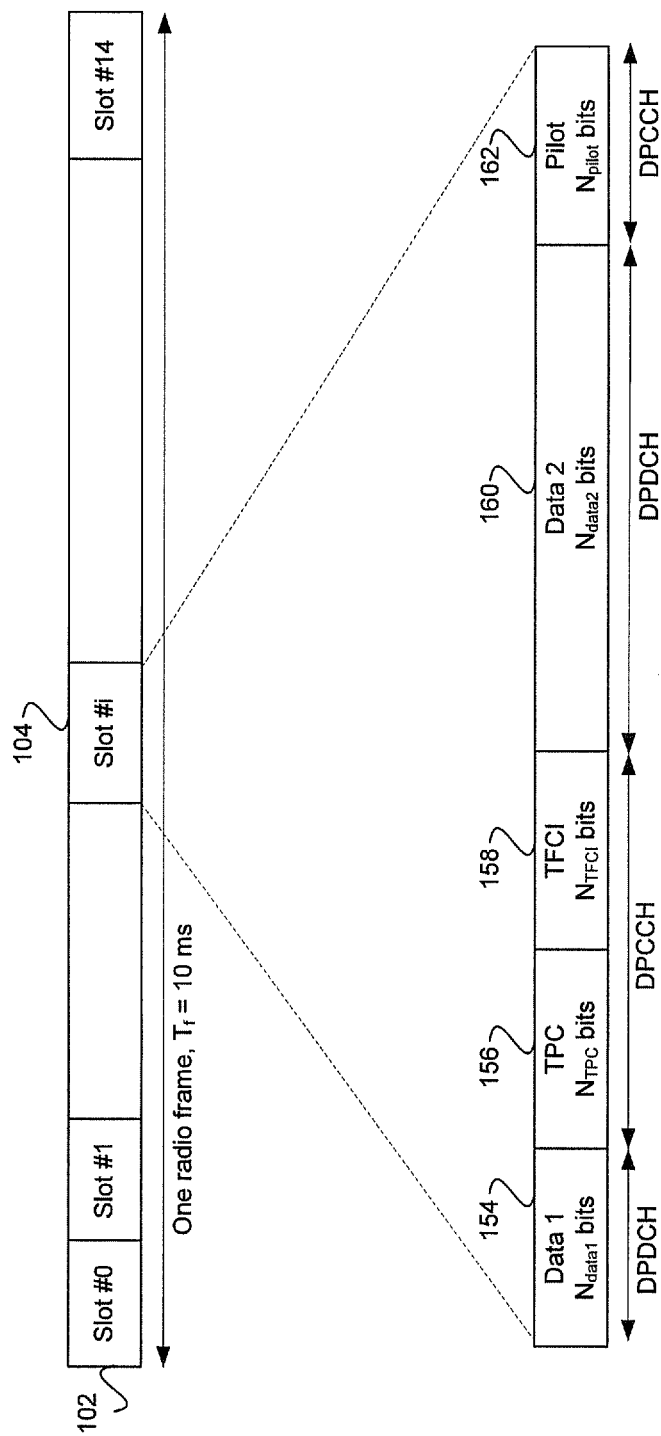
FIG. 1B is a block diagram of an exemplary radio frame format of a downlink dedicated physical channel (DPCH), in accordance with an embodiment of the invention.

FIG. 1B is a block diagram of an exemplary radio frame format of a downlink dedicated physical channel (DPCH), in accordance with an embodiment of the invention. Referring to FIG. 1B, there is shown a radio frame format 102, with a time period $T_f$ equal to 10 ms, for example. The radio frame 102 may comprise a plurality of slots, for example, 15 slots. Each of the slots in the radio frame 102, for example, slot #i 104 may comprise a plurality of dedicated physical data channels (DPDCH) and a plurality of dedicated physical control channels (DPCCH). The time period of each slot in the radio frame 102, for example, time period of slot #i may be equal to $10*2^k$ bits, where k=0 . . . 7, for example.

The DPDCH is a type of downlink channel, which may be represented as an I/Q code multiplexed within each radio frame 102. The downlink DPDCH may be utilized to carry data, for example, data 1 154 comprising $N_{data1}$ bits and data 2 160 comprising $N_{data2}$ bits. There may be zero, one, or a plurality of downlink dedicated physical data channels on each radio link.

The DPCCH is a type of downlink channel, which may be represented as an I/Q code multiplexed within each radio frame 102. The downlink DPCCH may be utilized to carry control information generated at the physical layer. The control information may comprise a transmit power control (TPC) block 156 comprising $N_{TPC}$ bits per slot, a transport format combination indicator (TFCI) block 158 comprising $N_{TFCI}$ bits per slot and a pilot block 162 comprising $N_{pilot}$ bits per slot.

Unlike the pilot bits 162 which are known a priori, that is, they are known when received by a receiver, the TPC bits 156 may be known or unknown when they are received. The term "a priori" means "formed or conceived beforehand." The phrase "not known" means that when some or all of the TPC bits are received at the receiver, the receiver cannot determine their actual values, and may need to determine the quality of the channel in order to determine whether the TPC bits are valid or not. Accordingly, various embodiments of the invention utilize channel quality to determine whether the TPC bits are valid or invalid. Therefore, conventional methods of computing a signal-to-noise ratio (SNR) metric based on multiplying the received signal by an a known sequence may not be used here.

In an embodiment of the invention, the quality of the downlink control channel transmitted with the downlink dedicated physical channel (DPCH) may be determined. Within one downlink DPCH, dedicated data may be transmitted in time-multiplex manner with control information. The control information may comprise pilot bits, transport format combination indicator (TFCI) bits and transmit power control (TPC) bits.

The user equipment 120 may be enabled to estimate the quality of reception of the TPC bits. The user equipment 120 may be, for example, a handheld phone or a wireless card in a laptop computer, for example. If the TPC bits are received under reliable channel conditions, they may be demodulated correctly by the user equipment 120, which in turn may detect correctly the power control commands sent down by the serving radio link, and adjust its transmit power appropriately, thereby avoiding interference. On the other hand, if the TPC bits are received under poor channel conditions, the TPC commands may be decoded incorrectly by the user equipment 120, which in turn may be transmitting inappropriate transmit power levels, creating undesirable interference and limiting the system capacity.

In another embodiment of the invention, in instances when multiple RL sets are active, such as RL1 and RL2, multiple TPC commands may be received at the user equipment 120. The TPC commands derived from RL1 and RL2 may comprise TPC bits, such as TPC bits 156. In addition, the received TPC bits from the multiple RL sets may be combined to determine a final TPC command for the user equipment 120. The final TPC command may be used by the user equipment 120 to make a decision as to whether to increase or decrease its transmit power by a determined step size.

Since some TPC commands may be received by the user equipment 120 under better channel conditions than others, a different weight value may be assigned to each TPC command in a radio link set. In this regard, a reliability factor may be determined for each of the one or more TPC commands received by the user equipment 120 based on a signal-to-noise ratio measurement, for example. The reliability factor may be used to compute a weighted sum of the multiple received TPC commands, resulting in the accumulated final TPC command. In addition, the reliability factor of each received TCP command may be compared to a threshold value. If the reliability factor for a particular received TCP command is lower than the threshold value, the reliability factor and the TCP command may not be used in the calculation of the final TCP command The sign of the final TPC command may be used to determine whether to step up or down the transmit power of the user equipment 120.

Figure 1C:
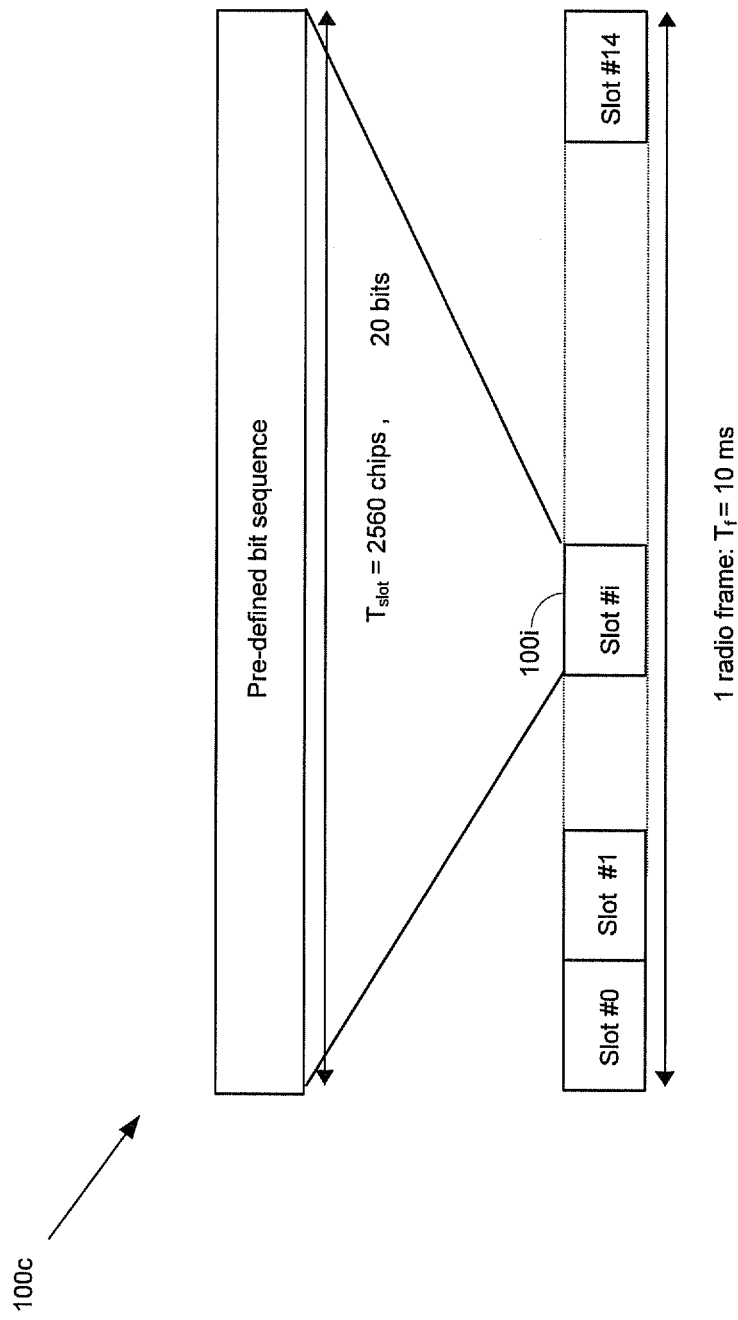
FIG. 1C is a block diagram of an exemplary radio frame format of a common pilot channel (CPICH), which may be used in accordance with an embodiment of the invention.

FIG. 1C is a block diagram of an exemplary radio frame format of a common pilot channel (CPICH), which may be used in accordance with an embodiment of the invention. Referring to FIG. 1C, each of the CPICH slots in the radio frame 100c, for example, slot #i 100i may comprise a fixed rate (30 kbps, SF=256) downlink physical channel that carries a pre-defined bit sequence.

Figure 1D:
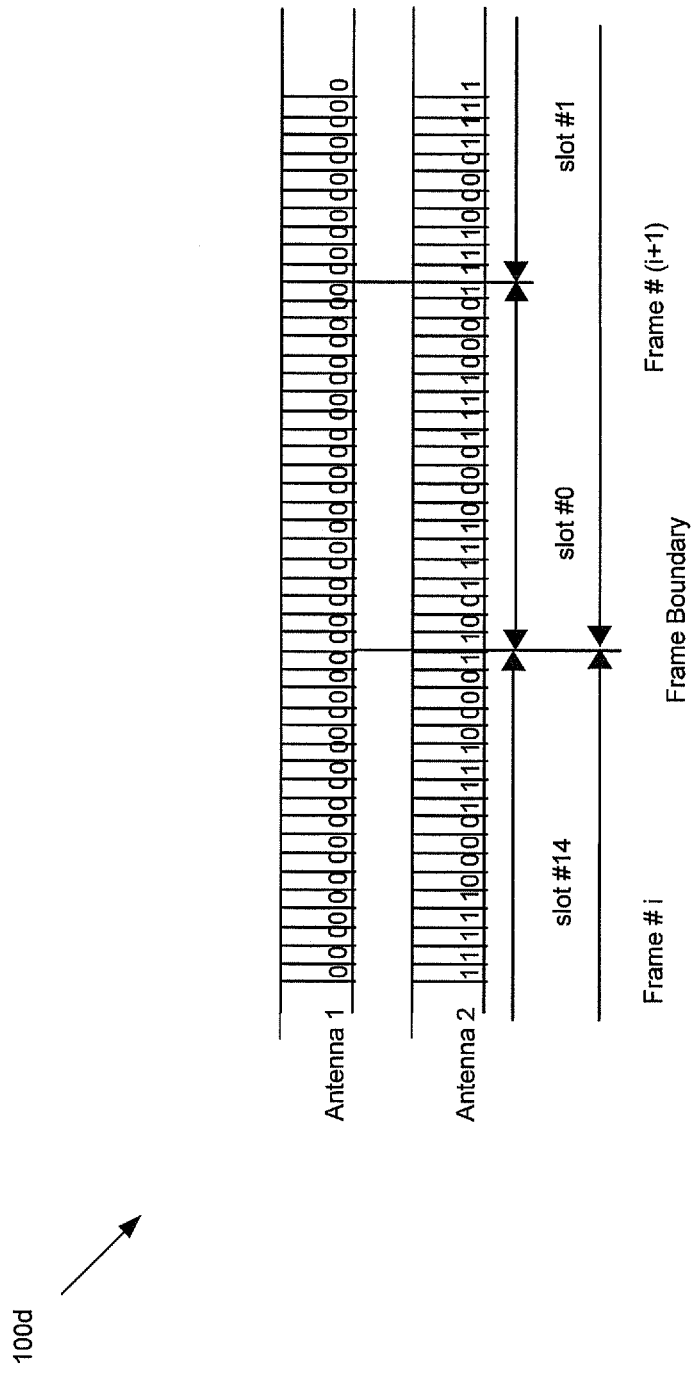
FIG. 1D is a block diagram of an exemplary modulation pattern for a common pilot channel (CPICH), which may be used in accordance with an embodiment of the invention.

FIG. 1D is a block diagram of an exemplary modulation pattern for a common pilot channel (CPICH), which may be used in accordance with an embodiment of the invention. Referring to FIG. 1D, there is illustrated the exemplary modulation pattern 100d for the CPICH 100c of FIG. 1C. In instances when transmit diversity is utilized on any downlink channel in the cell, such as open loop or closed loop transmit diversity, the CPICH may be transmitted from both antennas using the same channelization and scrambling code, for example. In this regard, the pre-defined bit sequence of the CPICH may be different for Antenna 1 and Antenna 2, as illustrated in FIG. 1D. In instances when no transmit diversity is utilized, the bit sequence of Antenna 1 in FIG. 1D may be utilized.

Figure 2A:
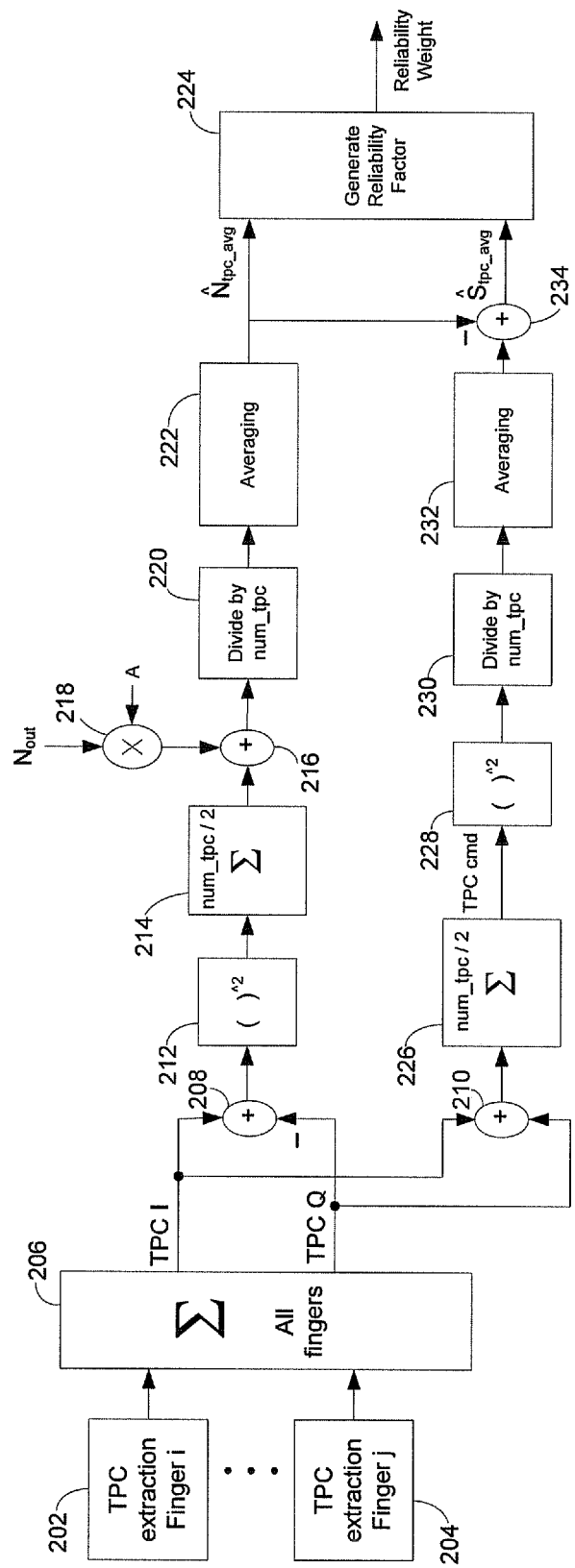
FIG. 2A is a block diagram illustrating determination of reliability weights in a WCDMA network, in accordance with an embodiment of the invention.

FIG. 2A is a block diagram illustrating determination of reliability weights in a WCDMA network, in accordance with an embodiment of the invention. Referring to FIG. 2A, there is shown a plurality of TPC extraction fingers for a given radio link (RL), for example, TPC extraction finger i 202 through TPC extraction finger j 204, a plurality of summing blocks 206, 208, 210, 214, 216, 226 and 234, a plurality of squaring blocks 212 and 228, a multiplier 218, a plurality of divider blocks 220 and 230, a plurality of averaging blocks 222 and 232 and a reliability weight generator block 224.

The signal-to-noise ratio (SNR), or equivalently the signal and noise power components of the TPC command received from a given radio link set, may be computed. A receiver technique that uses several baseband correlators to individually process several signal multipath components, for example, a rake receiver may be utilized. The correlator outputs also known as fingers may be combined to achieve improved communications reliability and performance.

U.S. application Ser. No. 11/173,871, filed Jun. 30, 2005, provides a detailed description of a RAKE receiver, and is hereby incorporated herein by reference in its entirety.

In a multipath-fading environment, a receiver structure may assign fingers to the multiple received paths, for example, TPC extraction finger i 202 and TPC extraction finger j 204. Those fingers belonging to the same radio link (RL) set may be summed by the summing block 206 to generate TPC_I_finger_sum (k) and TPC_Q_finger_sum (k) where k is index of the RL set.

For signal power, the value of the TPC bits may not be known a priori but all TPC bits received within a slot may have the same value. Therefore, by adding the I and Q components, the signal portion may add itself coherently, while the noise may add itself incoherently. This effect in a noise reduction and the signal power may be extracted. The i-th received TPC bit at a given slot and finger j may be expressed as:

$$\text{TPC\_bit}_{ij} = \sqrt{\frac{S_{TPC}}{2}} s_{b_i} |h_j|^2 + \underset{or\ imag}{\text{real}} (h_j^* n_{ij}). \quad (1)$$

where $S_{TPC}$ may be the signal power, $s_{b_i}$ may be the value of the TPC bit and may be either $+$ or $-1$, $h_j$ may be the complex channel gain at finger j and $n_{ij}$ may be a complex random variable representing the noise component of variance denoted by $$I_{oc} + I_{or} \sum_{k \neq j} |h_k|^2.$$

$I_{or}$ may be the total transmit power spectral density of the downlink signal at the base station antenna connector. $I_{oc}$ may be the power spectral density of a band limited white noise source (simulating interference from cells) as measured at the UE antenna connector.

The fingers corresponding to the radio links belonging to the same RL set together may be summed according to the following equation:

$$\text{TPC\_bit}_i \sqrt{\frac{S_{TPC}}{2}} s_{b_i} \sum_j |h_j|^2 + \sum_j \underset{orimag}{real} (h_j^* n_{ij}). \quad (2)$$

The TPC command may be the sum of the set of received TPC bits within a slot. Depending on the slot format, the number of TPC bits per slot, denoted by num_tpc may change.

$$\text{TPC\_cmd} = \quad (3)$$
$$\text{num\_tpc} \sqrt{\frac{S_{TPC}}{2}} s_{b_i} \sum_j |h_j|^2 + \sum_i^{num\_tpc/2} \sum_j \text{real}(h_j^* n_{ij}) + imag(h_j^* n_{ij}).$$

$$\text{TPC\_cmd}^2 = \quad (4)$$
$$\text{num\_tpc}^2 \frac{S_{TPC}}{2} \left(\sum_j |h_j|^2\right)^2 + \left(\sum_i^{num\_tpc/2} \sum_j \text{real}(h_j^* n_{ij}) + imag(h_j^* n_{ij})\right)^2.$$

where $E\left[\left(\sum_i^{num\_tpc/2} \sum_j \text{real}(h_j^* n_{ij}) + imag(h_j^* n_{ij})\right)^2\right] =$ $$\frac{\text{num\_tpc}}{2} \sum_j |h_j|^2 \left(I_{oc} + I_{or} \sum_{k \neq j} |h_k|^2\right).$$

The SNR of TPC command to be estimated may be:

$$SNR_{TPC\_cmd} = \text{num\_tpc} \frac{S_{TPC} \left(\sum_j |h_j|^2\right)^2}{\sum_j |h_j|^2 \left(I_{oc} + I_{or} \sum_{k \neq j} |h_k|^2\right)}. \quad (5)$$

The TPC bits may be received on I and Q components, composing a symbol. For example, if the total number of bits within a slot is equal to 2, TPC_bit$_1$ may be received on the I component as TPC$_{I1}$, and TPC_bit$_2$ may be received on the Q component as TPC$_{Q1}$. If the total number of bits within a slot may be equal to num_tpc, there may be num_tpc/2 I components and num_tpc/2 Q components.

The TPC bits (I and Q) may be summed by summing blocks 210 and 226 to generate TPC_sum (k), where num_tpc may be the number of TPC bits per slot and k is the index of a given Radio Link set. The generated sum TPC_sum (k) may be squared by the squaring block 228 to generate TPC_sum_sqr (k) and a new estimate may be obtained once per slot. The generated TPC_sum_sqr (k) may be divided by the number of TPC bits by the divider block 230 to generate TPC_sum_sqr_norm (k) according to the following equation:

TPC_sum_sqr_norm(k)=TPC_sum_sqr(k)/num_tpc

The generated norm TPC_sum_sqr_norm (k) may be averaged over a given time window by the averaging block 232 to generate TPC_sum_sqr_avg (k). An integrate-and-dump method, or an IIR filter may be utilized to carry out the averaging operation, for example.

In an embodiment of the invention, the signal power $\hat{S}_{tpc}$ may be computed according to the following equations:

$$\text{TPC\_sum\_sqr\_norm} = \frac{1}{\text{num\_tpc}} \left(\sum_{i=1}^{num\_tpc/2} TPC_{Ii} + TPC_{Qi}\right)^2. \quad (6)$$

In additive white gaussian noise (AWGN), $$\hat{S}_{tpc} = E[\text{TPC\_sum\_sqr\_norm}] = \frac{S_{tpc}}{2} \text{num\_tpc} + \frac{I_{oc}}{2}. \quad (7)$$

In flat fading, $$\hat{S}_{tpc} = E[\text{TPC\_sum\_sqr\_norm}] = \frac{S_{tpc}}{2}|h|^4 \text{num\_tpc} + \frac{I_{oc}}{2}|h|^2. \quad (8)$$

where h may be the complex channel gain at the finger.
In space time transmit diversity (STTD) flat fading, $$\hat{S}_{tpc} = \quad (9)$$
$$E[\text{TPC\_sum\_sqr\_norm}] = \frac{S_{tpc}}{4}\left(\sum_{m=1}^{2}|h_m|^2\right)^2 \text{num\_tpc} + \frac{I_{oc}}{2}\left(\sum_{m=1}^{2}|h_m|^2\right).$$

where $h_m$ is the complex channel gain corresponding to transmit antenna m in the base station.
In closed loop 1 (CL1) flat fading, $$\hat{S}_{tpc} = E[\text{TPC\_sum\_sqr\_norm}] = \quad (10)$$
$$\frac{S_{tpc}}{4}\|h_1 + wh_2\|^4 \text{num\_tpc} + \frac{I_{oc}}{2}\|h_1 + wh_2\|^2.$$

where $h_1$ and $h_2$ are the complex channel gains from the base station transmit antennas 1 and 2 and w is a weight.
In closed loop 2 (CL2) fading, $$\hat{S}_{tpc} = E[\text{TPC\_sum\_sqr\_norm}] = \quad (11)$$
$$\frac{S_{tpc}}{4}\|w_1 h_1 + w_2 h_2\|^4 \text{num\_tpc} + \frac{I_{oc}}{2}\|w_1 h_1 + w_2 h_2\|^2.$$

where $h_1$ and $h_2$ are the complex channel gains from the base station transmit antennas 1 and 2 and $w_1$ and $w_2$ are weights.

In another embodiment of the invention, the signal power estimate may be further improved by computing Stpc_avg (k) using the summer block 234 according to the following equation:

$$\text{Stpc\_avg}(k) = \text{TPC\_sum\_sqr\_avg}(k) - N\text{tpc\_avg}(k) \quad (12.)$$

where Ntpc_avg (k) may be the noise power estimate.

An alternative embodiment of the invention may implement a different calculation of the signal power by squaring all TPC bits (I and Q). The squared TPC bits may be summed to generate TPC_sum_sqr (k) and a new estimate may be obtained once per slot. The generated TPC_sum_sqr (k) may be divided by the number of TPC bits to generate TPC_sum_sqr_norm (k) according to the following equation:

$$\text{TPC\_sum\_sqr\_norm}(k) = \text{TPC\_sum\_sqr}(k)/\text{num\_tpc} \quad (13.)$$

The generated norm TPC_sum_sqr (k) may be averaged over a given time window to generate TPC_sum_sqr_avg (k).

In an embodiment of the invention, the signal power $\hat{S}_{tpc}$ may be computed according to the following equations:

$$\text{TPC\_sum\_sqr\_norm} = \frac{1}{\text{num\_tpc}} \sum_{i=1}^{\text{num\_tpc}/2} TPC_{Ii}^2 + TPC_{Qi}^2 \quad (14)$$

$$\hat{S}_{tpc} = E[\text{TPC\_sum\_sqr\_norm}] = \frac{S_{tpc}}{2} + \frac{I_{oc}}{2}. \quad (15)$$

In another embodiment of the invention, the signal power estimate may be further improved by computing Stpc_avg (k) according to the following equation:

$$\text{Stpc\_avg}(k) = \text{TPC\_sum\_sqr\_avg}(k) - N\text{tpc\_avg}(k) \quad (16.)$$

and may be scaled by the average number of TPC bits over the averaging time period according to the following equation:

$$\text{Stpc\_avg}(k) = \text{Stpc\_avg}(k) * \text{num\_tpc\_avg}(k) \quad (17.)$$

where num_tpc may vary from slot to slot.

For noise power, the value of the TPC bits may not be known a priori but all TPC bits received within a slot may have the same value. Therefore, by subtracting the I component from the Q component or vice-versa, the signal portion may cancel itself out, leaving the residual noise.

In an embodiment of the invention, the noise power may be computed from TPC bits only. The sign bit on both the I and Q components of the TPC symbol may be the same. Therefore for each symbol, $$TPC_I - TPC_Q = n_I - n_Q \quad (18)$$

Since there are $$\frac{\text{num\_tpc}}{2}$$

symbols per slot, there may be $$\frac{\text{num\_tpc}}{2}$$

noise samples per slot. In AWGN, the noise power estimate may be generated according to the following equation:

$$\hat{N}_{tpc} = E\left[\sum_{i=1}^{\text{num\_tpc}/2}(TPC_{Ii} - TPC_{Qi})^2\right] \quad (19)$$
$$= E\left[\sum_{i=1}^{\text{num\_tpc}/2}(n_{Ii} - n_{Qi})^2\right]$$
$$= \text{num\_tpc} \cdot \frac{I_{oc}}{2}.$$

In flat fading, the noise power estimate may be generated according to the following equation:

$$\hat{N}_{tpc} = |h|^2 \text{num\_tpc} \cdot \frac{I_{oc}}{2}. \quad (20)$$

In STTD flat fading, the noise power estimate may be generated according to the following equation:

$$\hat{N}_{tpc} = \left(\sum_{m=1}^{2}|h_m|^2\right)\text{num\_tpc} \cdot \frac{I_{oc}}{2}. \quad (21)$$

In CL1 flat fading, the noise power estimate may be generated according to the following equation:

$$\hat{N}_{tpc} = \|h_1 + wh_2\|^2 \text{num\_tpc} \cdot \frac{I_{oc}}{2}. \tag{22}$$

In CL2 fading, the noise power estimate may be generated according to the following equation:

$$\hat{N}_{tpc} = \|w_1 h_1 + w_2 h_2\|^2 \text{num\_tpc} \cdot \frac{I_{oc}}{2}. \tag{23}$$

The TPC bits may be subtracted from each other (I–Q) by the summing block 208. The subtracted TPC bits may be squared by the squaring block 212 to generate TPC_sqr_diff (k). The squared difference TPC_sqr_diff (k) may be summed by the summing block 214 over the number of TPC symbols, where the number of symbols per slot may be equal to num_tpc/2 to generate Ntpc (k) and a new estimate may be obtained once per slot. The sum Ntpc (k) may be divided by the number of TPC bits by the divider block 220 to generate Ntpc_norm (k) according to the following equation:

$$N\text{tpc\_norm}(k) = N\text{tpc}(k)/\text{num\_tpc} \tag{24.}$$

The generated norm Ntpc_norm (k) may be averaged by the averaging block 222 over a given time window to generate Ntpc_avg (k).

An alternative embodiment of the invention may improve the accuracy on the noise power estimate. The noise power may be computed based on the TPC bits received within a slot. For slot formats with a small number of TPC bits per slot, for example, 2 TPC bits per slot, the variance of the noise power estimate may be quite large. This embodiment improves the noise estimate by augmenting the noise estimated from TPC bits by other sources of noise estimates. By adding extra samples of noise estimates for a given slot and averaging over the total number of noise samples available, the variance of the estimate may be reduced or the estimate may be more accurate.

In an exemplary embodiment of the invention, the noise estimate may be augmented from the estimate obtained from the reception of the dedicated pilot bits (block 162 on FIG. 1B), or the common pilot bits (CPICH). A scaling factor denoted by A, between the outsourced noise power estimate Nout and the noise power estimate from the TPC bits may be used, and the improved noise estimate Ntpc_aug (k) may be computed using the multiplier 218 according to the following equation:

$$N\text{tpc\_aug}(k) = (N\text{tpc}(k) + A^*N\text{out}(k))/2 \tag{25.}$$

A is a scaling factor that may be dependent upon the number of TPC bits per slot.

In an embodiment of the invention, the noise power may be computed from a combination of TPC bits and pilot bits. In a non-diversity flat fading case, the soft value of each of the dedicated pilot bits at each slot on may be obtained from the hardware and the i-th pilot symbol may be represented by the following equation:

$$z_i = \sqrt{\frac{S_{DED}}{2}} x_i |h|^2 + n_i h^*. \tag{26}$$

The number of dedicated pilot bits per slot may be denoted by num_ded and all num_ded/2 dedicated pilot symbols may be stacked in a vector according to the following equation:

$$\underline{z} = \sqrt{\frac{S_{DED}}{2}} |h|^2 \underline{x} + \underline{n}'. \tag{27}$$

where n' may be the post-combining noise of the power to be estimated.

The pilot symbol sequence $$\underline{x}^T = \left[ x_0, x_1, x_2, \ldots, x_{\frac{\text{num\_ded}}{2}-1} \right]$$

may be known a priori, and it may be possible to find an orthogonal sequence $$\underline{y}^T = \left[ y_0, y_1, y_2, \ldots, y_{\frac{\text{num\_ded}}{2}-1} \right]$$

such that $$\underline{y}^H \underline{x} = 0 \tag{28.}$$

Since the pilot symbols are comprised of –1 s and 1 s, the sequence in y may be also comprised of –1 s and 1 s. Multiplying the received symbols z by $y^H$ involves a sign change manipulation on the received I and Q and results in the following equation:

$$\underline{y}^H \underline{z} = \underline{y}^H \underline{n}' \tag{29.}$$

The variance of n' may be expressed by the following equation:

$$\sigma_{n'}^2 = |h|^2 I_{oc} = E[n'_i n'^*_i], i = 0, \ldots, \frac{\text{num\_ded}}{2} - 1. \tag{30}$$

If the orthogonal sequence y may be normalized such that $$\underline{y}^H \underline{y} = 1 \tag{31.}$$

Then the variance of $\underline{y}^H \underline{n}'$ may be expressed as:

$$E[\underline{y}^H \underline{n}' \underline{n}'^H \underline{y}] = \sigma_{n'}^2 \tag{32.}$$

From equation (25.), the noise power from TPC bits may be expressed as:

$$\hat{N}_{tpc} = |h|^2 \text{num\_tpc} \cdot \frac{I_{oc}}{2}. \tag{33}$$

Total noise estimate may be expressed as:

$$\hat{N} = \left( \hat{N}_{tpc} + \frac{\text{num\_tpc}}{2} \cdot \sigma_{n'}^2 \right) / 2. \tag{34}$$

In the case of flat fading, STTD with the number of pilot bits>2, the soft value of each dedicated pilot bits at each slot may be obtained. The i-th received dedicated pilot symbol for antenna 1 may be equal to:

$$z_{1i} = \sqrt{\frac{S_{DED}}{4}} (x_{1i}h_1 + x_{2i}h_2)h_1^* + n_i h_1^*. \quad (35)$$

Similarly for antenna 2, $$z_{2i} = \sqrt{\frac{S_{DED}}{4}} (x_{1i}h_1 + x_{2i}h_2)h_2^* + n_i h_2^*. \quad (36)$$

All num_ded/2 dedicated pilot symbols may be stacked in a vector according to the following equations:

$$\underline{z}_1 = \sqrt{\frac{S_{DED}}{4}} (\underline{x}_1 h_1 + \underline{x}_2 h_2)h_1^* + \underline{n}_1'. \quad (37)$$

$$\underline{z}_1 = \sqrt{\frac{S_{DED}}{4}} (\underline{x}_1 |h_1|^2 + \underline{x}_2 h_2 h_1^*) + \underline{n}_1'. \quad (38)$$

$$\underline{z}_1 = \sqrt{\frac{S_{DED}}{4}} [\underline{x}_1 \ \underline{x}_2] \begin{bmatrix} |h_1|^2 \\ h_2 h_1^* \end{bmatrix} + \underline{n}_1', \quad (39.)$$

and $$\underline{z}_2 = \sqrt{\frac{S_{DED}}{4}} [\underline{x}_1 \ \underline{x}_2] \begin{bmatrix} h_1 h_2^* \\ |h_2|^2 \end{bmatrix} + \underline{n}_2'. \quad (40.)$$

The pilot symbol sequences $\underline{x}_1$ and $\underline{x}_2$ are known a priori and it may be possible to find an orthogonal sequence $\underline{y}^T$ such that $$\underline{y}^H \underline{x}_1 = 0 \text{ and } \underline{y}^H \underline{x}_2 = 0 \quad (41.)$$

$$\underline{y}^H \underline{z}_1 = \underline{y}^H \underline{n}_1' \text{ and } \underline{y}^H \underline{z}_2 = \underline{y}^H \underline{n}_2' \quad (42.)$$

The variance of $n_1'$ may be $$\sigma_{n_1'}^2 = |h_1|^2 I_{oc} = E[n_{1i}' n_{1i}'^*], \ i = 0, \ldots, \frac{\text{num\_ded}}{2} - 1, \quad (43.)$$

and $$\sigma_{n_2'}^2 = |h_2|^2 I_{oc}. \quad (44.)$$

If the orthogonal sequence $\underline{y}$ may be normalized such that $$\underline{y}^H \underline{y} = 1 \quad (45.)$$

Then the variance of $\underline{y}^H \underline{n}_i'$ may be $$E[\underline{y}^H \underline{n}_i' \underline{n}_i'^H \underline{y}] = \sigma_{n_i}^2, \ i=1,2 \quad (46.)$$

In this regard, the noise power from the dedicated pilot bits may be obtained by the following equation:

$$|\underline{y}^H \underline{z}_1|^2 + |\underline{y}^H \underline{z}_2|^2 = \sigma_{n_1'}^2 + \sigma_{n_2'}^2 = (|h_1|^2 + |h_2|^2) I_{oc} \quad (47.)$$

From equation (32) the noise power from TPC bits may be $$\hat{N}_{tpc} = \left(\sum_{m=1}^{2} |h_m|^2\right) \text{num\_tpc} \cdot \frac{I_{oc}}{2}. \quad (48)$$

Total noise estimate may be:

$$\hat{N} = \left(\hat{N}_{tpc} + \frac{\text{num\_tpc}}{2} \cdot (\sigma_{n_1'}^2 + \sigma_{n_2'}^2)\right) / 2. \quad (49)$$

When the number of pilot bits=2, the 2 pilot bits broadcast by antenna 2 precede the last two bits of the data2 field. The pilot bits may be STTD-encoded with the data and, therefore, may need to be retrieved post-STTD decoding. The hardware may be provisioned to extract pilot bits at the output of the combiner, post-STTD decoding. The pilot symbol obtained post-STTD decoding may be:

$$z = \sqrt{\frac{S_{DED}}{4}} x_1 \sum_{m=1}^{2} |h_m|^2 + \sum_{m=1}^{2} h_m^* n_m, \quad (50.)$$

where $x_1$ may be the known pilot symbol sent from antenna 1 and $$E\left[\left(\sum_{m=1}^{2} h_m^* n_m\right)^2\right] = \left(\sum_{m=1}^{2} |h_m|^2\right) I_{oc}.$$

$$pilotI = \text{Re}(z) = \sqrt{\frac{S_{DED}}{4}} I_{seq} \sum_{m=1}^{2} |h_m|^2 + \text{Re}\left(\sum_{m=1}^{2} h_m^* n_m\right). \quad (51)$$

$$pilotQ = \text{Im}(z) = \sqrt{\frac{S_{DED}}{4}} Q_{seq} \sum_{m=1}^{2} |h_m|^2 + \text{Im}\left(\sum_{m=1}^{2} h_m^* n_m\right). \quad (52)$$

The hardware multiplies pilot I and pilot Q by $I_{seq}$ and $Q_{seq}$ respectively and generates the 2 bits. The noise power may be calculated by the following equations:

$$\sigma_n^2 = (pilotI - pilotQ)^2 \quad (53.)$$

$$\sigma_n^2 = (|h_1|^2 + |h_2|^2) I_{oc} \quad (54.)$$

The total noise estimate may be expressed as:

$$\hat{N} = \left(\hat{N}_{tpc} + \frac{\text{num\_tpc}}{2} \cdot \sigma_n^2\right) / 2. \quad (55)$$

In the case of CL1 flat fading, the soft value of each dedicated pilot bits at each slot on a per-finger basis may be obtained from the hardware.

$$\underline{z}_1 = \sqrt{\frac{S_{DED}}{4}} [\underline{x}_1 \ \underline{x}_2] \begin{bmatrix} |h_1|^2 \\ w h_1^* h_2 \end{bmatrix} + \underline{n}_1'. \quad (56)$$

$$\underline{z}_2 = \sqrt{\frac{S_{DED}}{4}} [\underline{x}_1 \ \underline{x}_2] \begin{bmatrix} h_1 h_2^* \\ w |h_2|^2 \end{bmatrix} + \underline{n}_2'. \quad (57)$$

The weight w may be known in the firmware, $$z = z_1 + w^* z_2 \quad (58)$$

-continued $$= \sqrt{\frac{S_{DED}}{4}} \begin{bmatrix} x_1 & x_2 \end{bmatrix} \begin{bmatrix} |h_1|^2 + w^* h_1 h_2^* \\ w h_1^* h_2 + |w|^2 |h_2|^2 \end{bmatrix} + \underline{n}_1' + w^* \underline{n}_2'.$$

Multiplying $\underline{z}$ by the orthogonal sequence $\underline{y}$, $$\underline{y}^H \underline{z} = \underline{y}^H (\underline{n}_1' + w^* \underline{n}_2'). \tag{59}$$

$$\underline{y}^H \underline{z} = \underline{y}^H \left( \begin{bmatrix} n_0 h_1^* \\ \vdots \\ n_{\frac{num\_ded}{2}-1} h_1^* \end{bmatrix} + w^* \begin{bmatrix} n_0 h_2^* \\ \vdots \\ n_{\frac{num\_ded}{2}-1} h_2^* \end{bmatrix} \right). \tag{60}$$

$$\underline{y}^H \underline{z} = \underline{y}^H \left( \begin{bmatrix} n_0 (h_1^* + w^* h_2^*) \\ \vdots \\ n_{\frac{num\_ded}{2}-1} (h_1^* + w^* h_2^*) \end{bmatrix} \right) = \underline{y}^H \underline{n}_{c/1}. \tag{61}$$

The variance of $\underline{n}_{c/1}$ may be $$\sigma_{\underline{n}_{c/1}}^2 = \|h_1 + w h_2\|^2 I_{oc} \tag{62}$$

$$= E[n_{c/1i} n_{c/1i}^*], i = 0, \ldots, \frac{num\_ded}{2} - 1.$$

$$|\underline{y}^H \underline{z}|^2 = \sigma_{\underline{n}_{c/1}}^2. \tag{63}$$

From equation (27.) the noise power from TPC bits may be $$\hat{N}_{tpc} = \|h_1 + w h_2\|^2 \text{num\_tpc} \cdot \frac{I_{oc}}{2}. \tag{64}$$

Total noise estimate may be:

$$\hat{N} = \left( \hat{N}_{tpc} + \frac{\text{num\_tpc}}{2} \cdot \sigma_{\underline{n}_{c/1}}^2 \right) / 2. \tag{65}$$

In the case of CL2 fading, the same pilot pattern may be used on both the antennas.

$$z_{1i} = \sqrt{\frac{S_{DED}}{4}} (w_1 h_1 + w_2 h_2) x_i h_1^* + n_i h_1^*. \tag{66}$$

All num_ded/2 dedicated pilot symbols may be stacked in a vector according to the following equations:

$$\underline{z}_1 = \sqrt{\frac{S_{DED}}{4}} (w_1 h_1 + w_2 h_2) \underline{x} h_1^* + \underline{n}_1'. \tag{67}$$

$$\underline{z}_2 = \sqrt{\frac{S_{DED}}{4}} (w_1 h_1 + w_2 h_2) \underline{x} h_2^* + \underline{n}_2'. \tag{68}$$

The weights $w_1$, and $w_2$ are known in the firmware, $$\underline{z} = w_1^* \underline{z}_1 + w_2^* \underline{z}_2. \tag{69}$$

$$\underline{z} = \sqrt{\frac{S_{DED}}{4}} \|w_1 h_1 + w_2 h_2\|^2 \underline{x} + w_1^* \underline{n}_1' + w_2^* \underline{n}_2'. \tag{70}$$

Multiplying $\underline{z}$ by the orthogonal sequence $\underline{y}$, $$|\underline{y}^H \underline{z}|^2 = \sigma_{\underline{n}_{c/2}}^2 = \|w_1 h_1 + w_2 h_2\|^2 I_{oc} \tag{71.}$$

From equation (34.) the noise power from TPC bits may be $$\hat{N}_{tpc} = \|w_1 h_1 + w_2 h_2\|^2 \text{num\_tpc} \cdot \frac{I_{oc}}{2}. \tag{72}$$

Total noise estimate may be:

$$\hat{N} = \left( \hat{N}_{tpc} + \frac{\text{num\_tpc}}{2} \cdot \sigma_{\underline{n}_{c/2}}^2 \right) / 2. \tag{73}$$

The various embodiments of the invention described above may yield a TPC command signal and noise power estimate for each one of a plurality of radio link sets. The signal and noise power estimate may be updated periodically, for example, at the rate of once per slot. In one embodiment of the invention, a TPC command signal and noise power estimate may be used to determine a reliability weight value corresponding to the received TPC command. A total or accumulated TPC command may then be determined based on the received TPC commands for each one of the pluralities of radio link sets and the corresponding reliability weights for each of the TPC commands. Transmit power may then be adjusted based on the determined total TPC command. For example, if the sign of total TPC command is negative, the transmit power may be decreased, and if the sign of total TPC command is positive, the transmit power may be increased.

In another embodiment of the invention, user equipment within a wireless communication network, may estimate the noise power of a dedicated DPCH. The estimated noise power may then be utilized by the user equipment to adjust transmit power and improve signal processing within the wireless communication network. The total noise power of the dedicated DPCH may be estimated utilizing, for example, a first noise power estimate and a second noise power estimate. In this regard, the first noise power estimate may be generated utilizing TPC bits, and the second noise power estimate may be generated utilizing pilot bits. The TPC bits and the pilot bits may be part of control information communicated to the user equipment via the dedicated DPCH.

U.S. patent application Ser. No. 11/355,110 describes exemplary steps that may be utilized to calculate a signal power estimate and a noise power estimate of the DPCH, and is hereby incorporated by reference in its entirety.

The estimation of channel quality statistics (such as signal-to-noise ratio (SNR)) at the receiver end of the mobile handset is of paramount importance as the knowledge of such statistics allows the handset to control its behavior under a variety of conditions. Typically, the SNR is estimated based on the reception of certain control bits sent on the downlink channel(s). Specifically, the knowledge of the SNR corresponding to the TPC bits allows the handset to (a) adjust its transmit power, (b) decide whether it is in an in-synchronization or out-of-synchronization situation and (c) combine the TPC commands coming from various serving base stations in a weighted fashion where each weight may be a function of the calculated SNR(s). Alternatively, the knowledge of the SNR corresponding to the DPCH dedicated pilot bits allows the handset to generate TPC commands sent on the uplink for downlink power control (DLPC). Furthermore, the knowledge of the SNR corresponding to the common pilot bits (CPICH) may be used to estimate the SNR of the HSDPA data channel (HS-DPCH) which may then be used to select an appropriate coding rate and modulation value identified by a channel quality indicator (CQI) value.

The SNR may be estimated by calculating the ratio between a signal power component and a noise power component. While the signal power component is specific to each set of control bits (because each set of control bits may be a assigned a different power allocation which is unknown at the receiver handset), the noise power component computed from each set of control bits may be related to one another. By combining the multiple noise power components into a total noise power component, the overall noise power estimate is improved and each SNR estimate is improved, yielding an improved behavior of the handset.

Figure 2B:
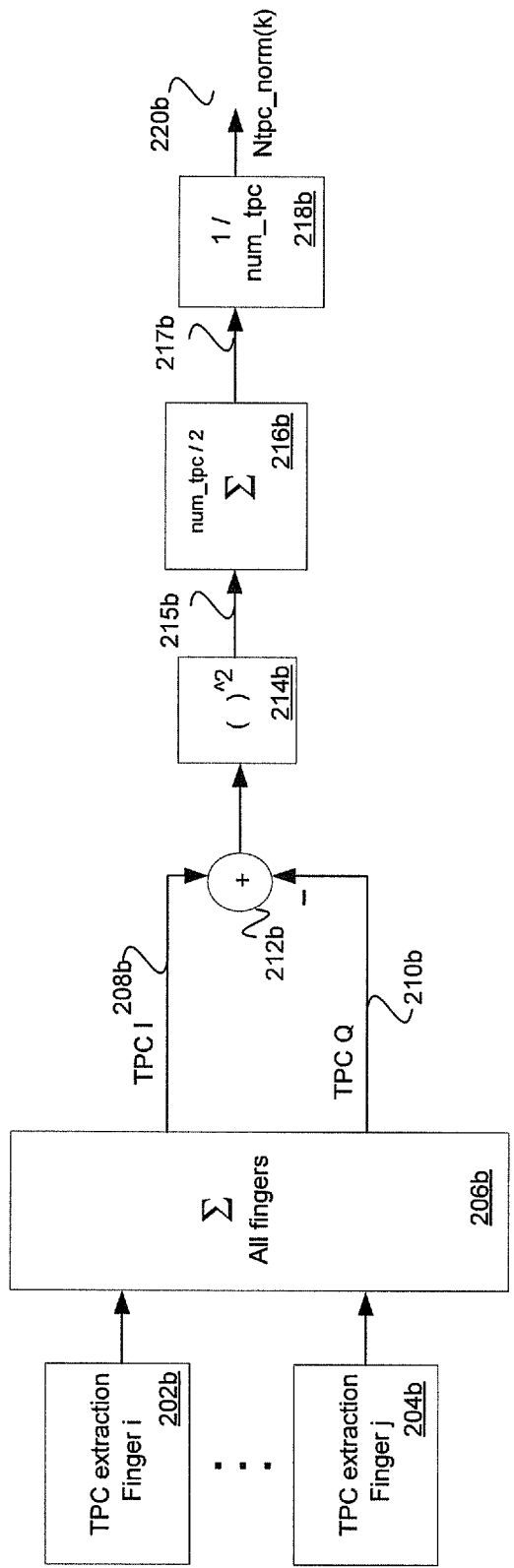
FIG. 2B is a block diagram illustrating determination of a first noise power estimate in a WCDMA network, in accordance with an embodiment of the invention.

FIG. 2B is a block diagram illustrating determination of a first noise power estimate in a WCDMA network, in accordance with an embodiment of the invention. Referring to FIG. 2B, there is shown a plurality of TPC extraction fingers for a given radio link (RL), for example, TPC extraction finger i $202b$ through TPC extraction finger j $204b$, a plurality of summing blocks $206b$, $212b$, and $216b$, a squaring block $214b$, and a divider block $2218b$.

In a multipath-fading environment, a receiver structure may assign fingers to the multiple received paths, for example, TPC extraction finger i $202b$ and TPC extraction finger j $204b$. Those fingers belonging to the same radio link (RL) set may be summed by the summing block $206b$ to generate TPC I sum $208b$ and TPC Q sum $210b$. In one embodiment of the invention, a first noise power estimate may be computed utilizing TPC bits. The i-th received TPC bit at a given slot and finger j may be expressed by the following equation:

$$\text{TPC\_bit}_{ij} = \sqrt{\frac{S_{TPC}}{2}} S_{b_i} |h_j|^2 + \underset{\text{or imag}}{\text{real}} (h_j^* n_{ij}), \quad (74.)$$

where $S_{TPC}$ may comprise the signal power, $S_{b_i}$ may comprise the value of the TPC bit and may be either (+1) or (−1). The value $h_j$ may comprise the complex channel gain at finger j, and $n_{ij}$, may comprise a complex random variable representing the noise component of variance denoted by the mathematical expression $$I_{oc} + I_{or} \sum_{k \neq j} |h_k|^2.$$

The value $I_{or}$ may comprise the total transmit power spectral density of the downlink signal at the base station antenna connector. The value $I_{oc}$ may comprise the power spectral density of a band limited white noise source, which may be simulating interference from cells, as measured at the UE antenna connector.

The sign bit on both the I and Q components of the TPC symbol may be the same. Therefore the following equation may be true for each symbol:

$$\text{TPC}_I - \text{TPC}_Q = n_I - n_Q \quad (75.)$$

Since there may be $$\frac{\text{num\_tpc}}{2}$$

symbols per slot, there may be $$\frac{\text{num\_tpc}}{2}$$

noise samples per slot. In an additive white Gaussian noise (AWGN) environment, the noise power estimate may be generated according to the following equation:

$$\hat{N}_{tpc} = \frac{1}{\text{num\_tpc}} E\left[\sum_{i=1}^{\text{num\_tpc}/2} (TPC_{Ii} - TPC_{Qi})^2\right] \quad (76)$$

$$= \frac{1}{\text{num\_tpc}} E\left[\sum_{i=1}^{\text{num\_tpc}/2} (n_{Ii} - n_{Qi})^2\right]$$

$$= \frac{I_{oc}}{2}.$$

If the channels are flat fading channels, the noise power estimate may be generated according to the following equation:

$$\hat{N}_{tpc} = |h|^2 \cdot \frac{I_{oc}}{2}. \quad (77)$$

In circumstances when STTD flat fading is present, the noise power estimate may be generated according to the following equation:

$$\hat{N}_{tpc} = \left(\sum_{m=1}^{2} |h_m|^2\right) \cdot \frac{I_{oc}}{2}. \quad (78)$$

In circumstances when CL1 flat fading is present, the noise power estimate may be generated according to the following equation:

$$\hat{N}_{tpc} = \|h_1 + wh_2\|^2 \cdot \frac{I_{oc}}{2}. \quad (79)$$

In circumstances when CL2 fading is present, the noise power estimate may be generated according to the following equation:

$$\hat{N}_{tpc} = \|w_1 h_1 + w_2 h_2\|^2 \cdot \frac{I_{oc}}{2}. \quad (80)$$

In operation, TPC bits from all fingers may be summed by the summing block $206b$. The resulting TPC Q sum $210b$ may be subtracted from the TPC I sum $208b$ by the summing block $212b$. The subtracted TPC bits may then be squared by the squaring block $214b$ to generate TPC_sqr_diff (k) $215b$. The squared difference TPC_sqr_diff (k) $215b$ may be summed by the summing block 216b over the number of TPC symbols. The number of TPC symbols per slot may be equal to num_tpc/2. In this regard, the summing block 216b may generate the sum Ntpc (k) 217b and a new estimate may be obtained once per slot. The sum Ntpc (k) 217b may be divided by the number of TPC bits using the divider block 218b in order to generate the first estimate of the noise power Ntpc_norm (k) 220b, according to the following equation:

$$Ntpc\_norm(k) = Ntpc(k)/num\_tpc$$

Figure 2C:
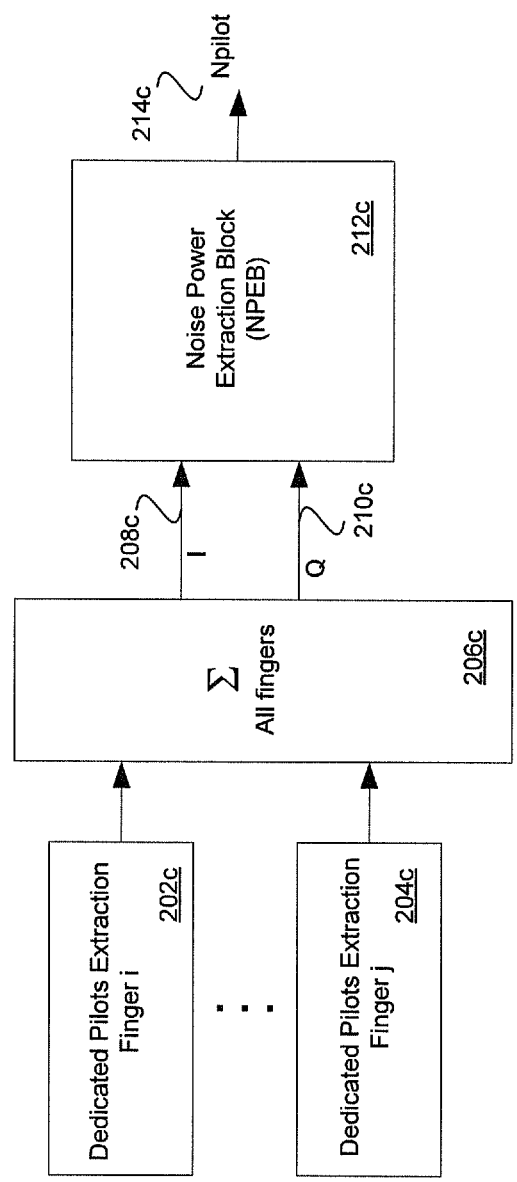
FIG. 2C is a block diagram illustrating determination of a second noise power estimate in a WCDMA network, in accordance with an embodiment of the invention.

FIG. 2C is a block diagram illustrating determination of a second noise power estimate in a WCDMA network, in accordance with an embodiment of the invention. Referring to FIG. 2C, there is shown a plurality of pilot extraction fingers for a given radio link (RL), for example, pilot extraction finger i 202c through pilot extraction finger j 204c, a summing block 206c, and a noise power extraction block (NPEB) 212c. In a multipath-fading environment, a receiver structure may assign fingers to the multiple received paths, for example, pilot extraction finger i 202c and pilot extraction finger j 204c. Those fingers belonging to the same radio link (RL) set may be summed by the summing block 206c to generate pilot I sum 208c and pilot Q sum 210c. In one embodiment of the invention, a second noise power estimate may be computed utilizing the pilot bits.

Within a wireless communication network, a received wireless signal may be modeled as a stationary random variable. From statistics theory, it follows that if x is a random variable, then its variance may be computed utilizing the following equation:

$$\sigma_x^2 = E[(x-E[x])^2] = E[x^2] - (E[x])^2 \quad (81.)$$

Consequently, the noise power of a received signal may be computed by estimating the variance of the received signal.

In operation, pilot bits from all fingers 202c, ..., 204c may be summed by the summing block 206c. The resulting pilot Q sum 210c and the pilot I sum 208c may be communicated to the noise power extraction block (NPEB) 212c. The NPEB 212c may calculate the second noise power estimate using, for example, the variance of the received wireless signal.

Figure 2D:
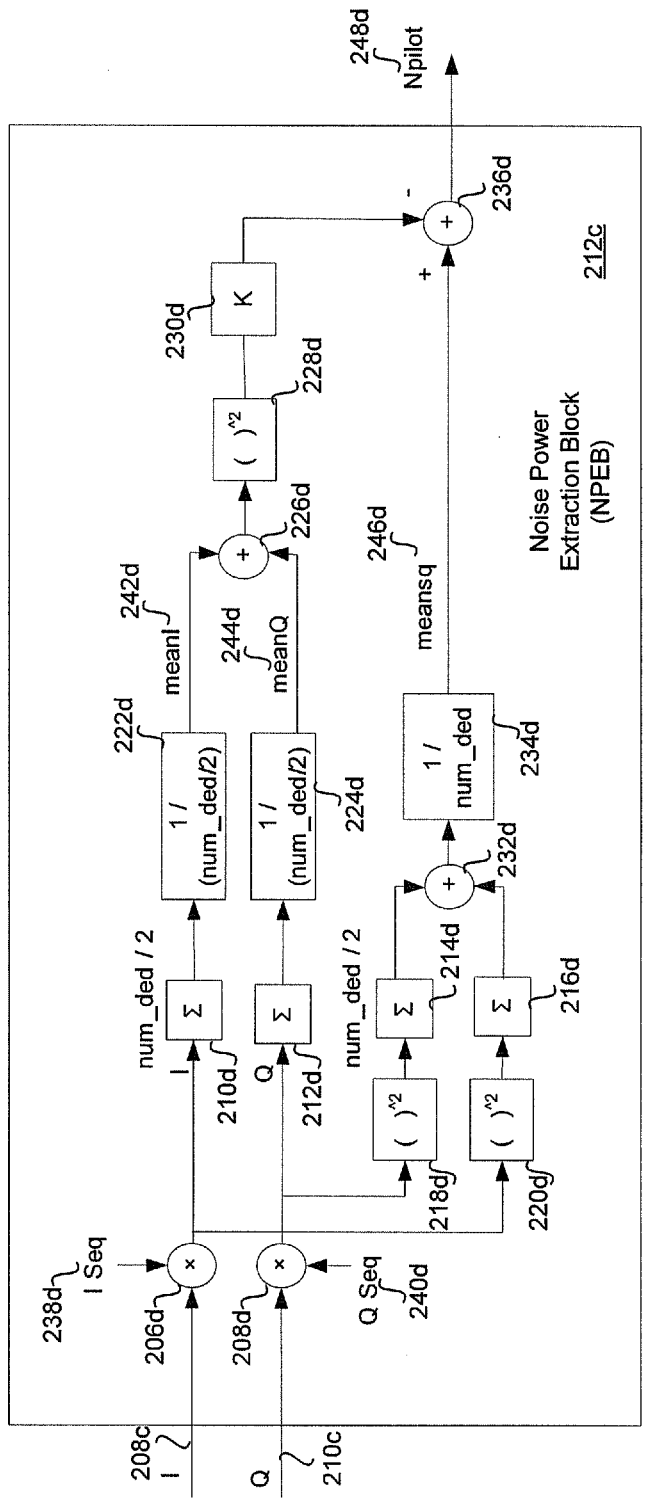
FIG. 2D is a block diagram of a noise power extraction block, which may be used in accordance with an embodiment of the invention.

FIG. 2D is a block diagram of a noise power extraction block, which may be used in accordance with an embodiment of the invention. Referring to FIG. 2D, the NPEB 212c may comprise multiplying blocks 206d, 208d, and 230d, and a plurality of summing blocks 210d, 212d, 214d, 216d, 232d, 226d, and 236d. The NPEB 212c may further comprise a plurality of squaring blocks 218d, 220d, and 228d, and divider blocks 222d, 224d, and 234d.

In circumstances when non-diversity flat fading is present, the soft value of each of the dedicated pilot bits at each slot may be obtained from the receiving user equipment utilizing a dedicated DPCH control message. The i-th pilot symbol may be represented by the following equation:

$$z_i = \sqrt{\frac{S_{DED}}{2}} (ISeq + jQSeq)|h|^2 + n_i h^*, \quad (82.)$$

where $S_{DED}$ comprises the transmit signal power, ISeq and QSeq comprise transmitted I and Q sequences, ISeq+jQSeq comprises a pilot symbol, h comprises the channel gain at the finger i, and $n_i$ comprises the noise of the signal received at the user equipment. The number of dedicated pilot bits per slot may be denoted by num_ded, which may result in num_ded/2 pilot symbols per slot.

Referring to FIGS. 2C and 2D, the pilot I sum 208c and the pilot Q sum 210c communicated from the summing block 206c to the NPEB 212c may be expressed using the following equations:

$$I = \sqrt{\frac{S_{DED}}{2}} ISeq|h|^2 + \text{Re}(n_i h^*) \quad (83)$$

and $$Q = \sqrt{\frac{S_{DED}}{2}} QSeq|h|^2 + \text{Im}(n_i h^*).$$

After the pilot I sum 208c and the pilot Q sum 210c are communicated to the NPEB 212c, each pilot sum 208c and 210c is multiplied by its own sequence I Seq 238d and Q Seq 240d, respectively, to remove phase rotation, using the multiplying blocks 206d and 208d. The I and Q post-derotation components may be expressed using the following equations:

$$I = \sqrt{\frac{S_{DED}}{2}} |h|^2 + \text{Re}(n_i h^*) ISeq = \sqrt{\frac{S_{DED}}{2}} |h|^2 + n_I, \quad (84.)$$

and $$q = \sqrt{\frac{S_{DED}}{2}} |h|^2 + \text{Im}(n_i h^*) QSeq = \sqrt{\frac{S_{DED}}{2}} |h|^2 + n_Q,$$

where $n_I$ and $n_Q$ comprise the noise components on the I and Q branches, for which power may be estimated.

In one embodiment of the invention, the second noise power estimate may be calculated using the subtraction of the mean of the received signal to the square $(E[x])^2$ from the mean of the received signal power $(E[x^2])$. The I and Q post-derotation components may be summed by the summing blocks 210d and 212d, respectively, over num_ded/2 The summed I and Q post-derotation components may then be normalized by the divider blocks 222d and 224d, respectively. For example, the divider blocks 22d and 224d may divide the summed I and Q post-derotation components by num_ded/2 to achieve normalization. The outputs of the divider blocks 222d and 224d may be denoted as meanI 242d and meanQ 244d and may be expressed using the following equations:

$$meanI = \sqrt{\frac{S_{DED}}{2}} |h|^2 + \frac{1}{num\_ded/2} \sum_i n_I(i) \quad (85)$$

and $$meanQ = \sqrt{\frac{S_{DED}}{2}} |h|^2 + \frac{1}{num\_ded/2} \sum_i n_Q(i).$$

Referring back to equation (81), the mean of the received signal to the square $(E[x])^2$ may be computed using the following equation:

$$(E[x])^2 = K \cdot (meanI + meanQ)^2 \quad (86.)$$

where K may comprise a scaling factor, which may be based on a hardware constant. The computation of $(meanI + meanQ)^2$ may be performed by the summing block 226d and the squaring block 228d, and the multiplication by the scaling factor K may be performed by the multiplying block 230d.

The I and Q post-derotation components may be squared by the squaring blocks 218d and 220d, respectively. The squared components may be expressed by the following equations:

$$I^2 = \left(\sqrt{\frac{S_{DED}}{2}}|h|^2 + n_I\right)^2 \quad (87)$$

and $$Q^2 = \left(\sqrt{\frac{S_{DED}}{2}}|h|^2 + n_Q\right)^2.$$

The squared components $I^2$ and $Q^2$ may be summed by the summing blocks 214d and 216d, respectively, num_ded/2. The summed squared components may then be combined by the summing block 232d. The combined output of the summing block 232d may be normalized by the divider block 234d. For example, the divider block 234d may divide the combined output of the summing block 232d by num_ded/2 to achieve normalization, thereby generating the mean meansq 246d of the received signal power $E[x^2]$. The meansq 246d may be expressed using the following equation:

$$meansq = \frac{1}{num\_ded}\left(\sum_{i=1}^{num\_ded/2} I^2(i) + \sum_{i=1}^{num\_ded/2} Q^2(i)\right). \quad (88)$$

Referring again to equation (81), the mean of the received signal power $E[x^2]$ may be computed using the following equation:

$$E[x^2] = meansq \quad (89.)$$

In addition, it may follow from equation (81) that noise power may be calculated by subtracting the mean of the received signal to the square $(E[x])^2$ from the mean of the received signal power $E[x^2]$, using the summing block 236d. In this regard, the second noise power estimate Npilot 248d may be calculated using the following equation:

$$Npilot = meansq - K \cdot (meanI + meanQ)^2 \quad (90.)$$

Figure 2E:
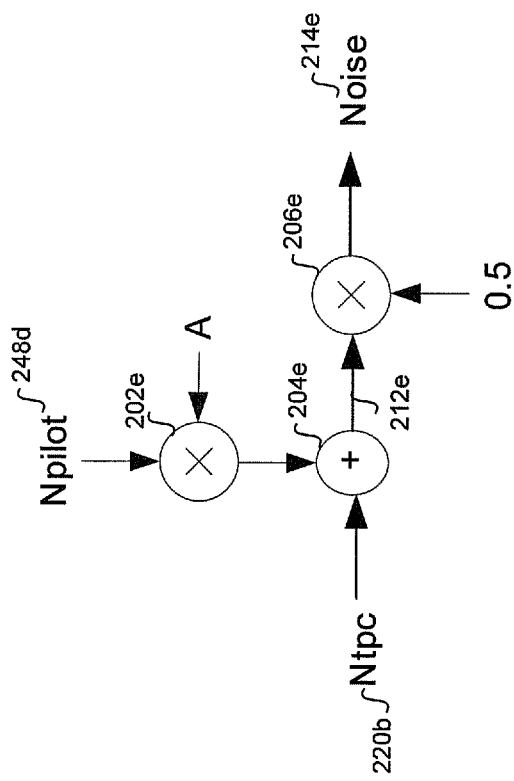
FIG. 2E is a block diagram illustrating determination of a total noise power estimate, in accordance with an embodiment of the invention.

FIG. 2E is a block diagram illustrating determination of a total noise power estimate, in accordance with an embodiment of the invention. Referring to FIG. 2E, there is illustrated a summing block 204e and multiplying blocks 202e and 206e. In another embodiment of the invention, the first noise power estimate Ntpc 220b and the second noise power estimate Npilot 248d may be combined using the summing block 204e and the multiplying blocks 202e and 206e to obtain the total noise power estimate $\hat{N}$ 214e. In this regard, the second noise power estimate Npilot 248d may be scaled by a scaling factor A using the multiplying block 202e. The scaled result may be added to the first noise power estimate Ntpc 220b using the summing block 204e. The resulting sum 212e may be divided by two using the multiplying block 206e. The total noise power estimate $\hat{N}$ 214e may be expressed using the following equation:

$$\hat{N} = (\hat{N}_{tpc} + A \cdot \hat{N}_{pilot})/2 \quad (91.)$$

Even though noise power may be computed using TPC and/or pilot bits, the present invention may not be so limited. The noise power may also be computed using, for example, CPICH bits according to similar methods as described herein. In instances when three noise estimates are available, the total noise power estimate X/may be calculated using the following equation:

$$\hat{N} = (\hat{N}_{tpc} + A \cdot \hat{N}_{pilot} + B \cdot \hat{N}_{cpich})/3 \quad (92.)$$

Figure 3:
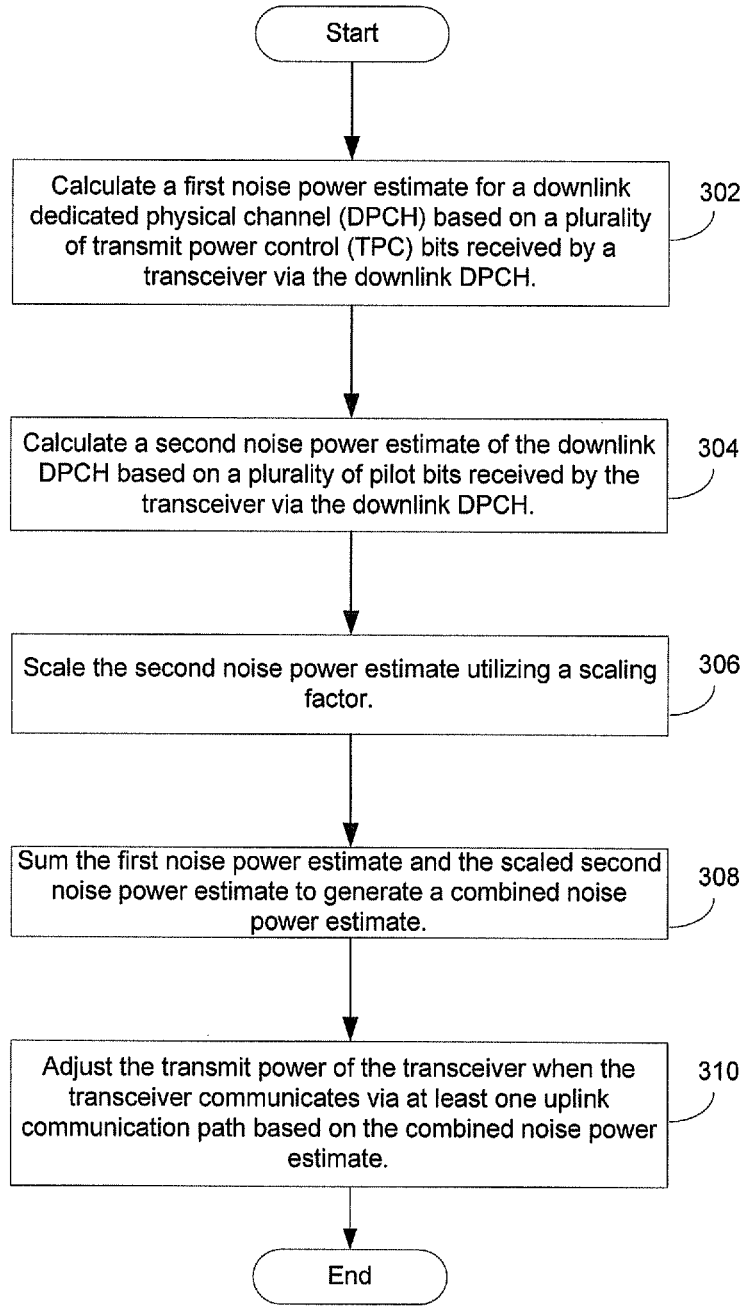
FIG. 3 is a flowchart illustrating exemplary steps for determining a total noise power estimate in a WCDMA network, in accordance with an embodiment of the invention.

FIG. 3 is a flowchart illustrating exemplary steps for determining a total noise power estimate in a WCDMA network, in accordance with an embodiment of the invention. Referring to FIGS. 2B, 2C, 2D, 2E, and 3, at 302, a first noise power estimate Ntpc 220b may be calculated for a downlink dedicated physical channel (DPCH) based on a plurality of transmit power control (TPC) bits received by a transceiver via the downlink DPCH and extracted via fingers 202b, . . . , 204b. A value of at least one of the plurality of TPC bits may not be known when the at least one of the plurality of TPC bits is received. At 304, the NPEB 212c may calculate a second noise power estimate Npilot 248d of the downlink DPCH based on a plurality of pilot bits received by the transceiver via the downlink DPCH and extracted via fingers 202c, . . . , 204c. At 306, the second noise power estimate Npilot 248d may be scaled by the multiplying block 202e utilizing a scaling factor A. At 308, the first noise power estimate Ntpc 220b and the scaled noise power estimate Npilot 248d may be summed by the summing block 204e to generate a combined noise power estimate. The combined noise power estimate 212e may be divided by two using the multiplying block 206e. At 310, the transmit power of the transceiver may be adjusted when the transceiver communicates via at least one uplink communication path based on the combined noise power estimate 214e.

Referring to FIG. 1A, in one embodiment of the invention, a total noise power estimate for a downlink channel RL1 may be calculated based on a plurality of control channel bits from a plurality of different types of control channels. The plurality of control channel bits may comprise at least two of: dedicated physical channel (DPCH) transmit power control (TPC) bits, DPCH pilot bits, and common pilot channel (CPICH) bits. A first noise power estimate may be calculated for the downlink channel RL1 based on a plurality of the DPCH TPC bits. A value of at least one of the plurality of DPCH TPC bits may not be known when the at least one of the plurality of DPCH TPC bits is received. A second noise power estimate may be calculated for the downlink channel RL1 based on a plurality of the DPCH pilot bits. The total noise power estimate may be calculated for the downlink channel RL1 based on the calculated first noise power estimate and the calculated second noise power estimate.

The calculated second noise power estimate may be scaled utilizing a scaling factor that is function of a number of TPC bits per slot to yield a scaled second noise power estimate. The first noise power estimate and the scaled second noise power estimate may be summed to yield the total noise power estimate. A third noise power estimate may be calculated for the downlink channel RL1 based on a plurality of the CPICH bits. The total noise power estimate may be calculated for the downlink channel RL1 based on the calculated first noise power estimate, the calculated second noise power estimate, and the calculated third noise power estimate. Transmit power of a transmitter may be adjusted when the transmitter communicates via the downlink channel RL1 based on the total noise power estimate.

Portions of the plurality of DPCH TPC bits that are received via the downlink channel to generate an in-phase (I) component and a quadrature (Q) component. The generated I component and the generated Q component may be subtracted to determine the first noise power estimate for the downlink channel. The subtracted I component and the generated Q component may be squared to determine the first noise power estimate for the downlink channel. The squared I component and the generated Q component may be summed over a plurality of TPC symbols to determine the first noise power estimate for the downlink channel. The plurality of TPC symbols is one half of the plurality of DPCH TPC bits per slot of the downlink channel. A norm of the summed I component and the generated Q component may be calculated by dividing the sum of the squared I component and the generated Q component by a number of the plurality of DPCH TPC bits per slot of the downlink channel to determine the first noise power estimate for the downlink channel. 13. A mean of the plurality of DPCH pilot bits that are received via the downlink channel may be calculated to yield a mean square estimate. A mean of a power of the plurality of DPCH pilot bits that are received via the downlink channel may be calculated to yield a mean power estimate. The mean square estimate may be subtracted from the mean power estimate to determine the second noise power estimate for the downlink channel.

Another embodiment of the invention may provide a machine-readable storage having stored thereon, a computer program having at least one code section for signal processing, the at least one code section being executable by a machine for causing the machine to perform steps as disclosed herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for signal processing, the method comprising calculating, a total noise power estimate for a downlink channel based on a plurality of control channel bits received via a plurality of different types of control channels, wherein said calculating said total noise power estimate comprises calculating a first noise power estimate for said downlink channel based on a plurality of dedicated physical channel (DPCH) transmit power control (TPC) bits, and wherein a value of at least one of said plurality of DPCH TPC bits is not known when said at least one of said plurality of DPCH TPC bits is received.

2. The method according to claim 1, wherein said calculating said total noise power estimate further comprises calculating a second noise power estimate for said downlink channel based on a plurality of DPCH pilot bits.

3. The method according to claim 2, wherein said calculating said total noise power estimate further comprises calculating said total noise power estimate for said downlink channel based on said calculated first noise power estimate and said calculated second noise power estimate.

4. The method according to claim 3, wherein said calculating said total noise power estimate further comprises:
scaling said calculated second noise power estimate utilizing a scaling factor that is a function of a number of TPC bits per slot to yield a scaled second noise power estimate; and
summing said first noise power estimate and said scaled second noise power estimate to yield said total noise power estimate.

5. The method, according to claim 2, wherein said calculating said total noise power estimate further comprises calculating a third noise power estimate for said downlink channel based on a plurality of common pilot channel (CPICH) bits.

6. The method according to claim 5, wherein said calculating said total noise power estimate further comprises calculating said total noise power estimate for said downlink channel based on said calculated first noise power estimate, said calculated second noise power estimate, and said calculated third noise power estimate.

7. The method according to claim 1, wherein said calculating said first noise power estimate comprises summing portions of said plurality of DPCH TPC bits that are received via said downlink channel to generate an in-phase (I) component and a quadrature (Q) component.

8. The method according to claim 7, wherein said calculating said first not se power estimate further comprises:
subtracting said generated I component and said generated Q component to determine said first noise power estimate for said downlink channel; and
squaring said subtracted I component and said generated Q component to determine said first noise power estimate for said downlink channel.

9. The method according to claim 8, wherein said calculating said first noise power estimate further comprises:

summing said squared I component and said generated Q component over a plurality of TPC symbols to determine said first noise power estimate for said downlink channel, wherein said plurality of TPC symbols is one half of said plurality of DPCH TPC bits per slot of said downlink channel.

10. The method according to claim 9, wherein said calculating said first noise power estimate further comprises:

calculating a norm of said summed I component and said generated Q component by dividing said sum of said squared I component and said generated Q component by a number of said plurality of DPCH TPC bits per slot of said downlink channel to determine said first noise power estimate for said downlink channel wherein said plurality of TPC symbols is one half of said plurality of DPCH TPC bits per slot of said downlink channel.

11. The method according to claim 2, wherein said calculating said second noise power estimate further comprises:

calculating a mean of a plurality of DPCH pilot bits that are received via said downlink channel to yield a mean square estimate;

calculating a mean of a power of said plurality of DPCH pilot bits that are received via said downlink channel to yield a mean power estimate; and subtracting said mean square estimate from said mean power estimate to determine said second noise power estimate for said downlink channel.

12. The method according to claim 1, further comprising adjusting transmit power of a transmitter when said transmitter communicates via said downlink channel based on said total noise power estimate.

13. A system for signal processing, the system comprising a circuitry configured to calculate a total noise power estimate for a downlink channel based on a plurality of control channel bits received via a plurality of different types of control channels, wherein said circuitry is configured to calculate a first noise power estimate for said downlink channel based on a plurality of dedicated physical channel (DPCH) transmit power control (TPC) bits, and wherein a value of at least one of said plurality of DPCH TPC bits is not known when said at least one of said plurality of DPCH TPC bits is received.

14. The system according to claim 13, wherein said circuitry is configured to calculate a second noise power estimate for said downlink channel based on a plurality of DPCH pilot bits.

15. The system according to claim 14, wherein said circuitry is configured to calculate said total noise power estimate for said downlink channel based on said calculated first noise power estimate and said calculated second noise power estimate.

16. The system according to claim 15, wherein:

said circuitry is configured to scale said calculated second noise power estimate utilizing a scaling factor that is a function of a number of TPC bits per slot to yield a scaled second noise power estimate; and said circuitry is configured to sum said first noise power estimate and said scaled second noise power estimate to yield said total noise power estimate.

17. The system according to claim 14, wherein said circuitry is configured to calculate a third noise power estimate for said downlink channel based on a plurality of common pilot channel (CPICH) bits.

18. The system according to claim 17, wherein said circuitry is configured to calculate said total noise power estimate for said downlink channel based on said calculated first noise power estimate, said calculated second noise power estimate, and said calculated third noise power estimate.

19. The system according to claim 13, wherein said circuitry is configured to sum portions of a plurality of DPCH TPC bits that are received via said downlink channel to generate an in-phase (I) component and a quadrature (Q) component.

20. The system according to claim 19, wherein:

said circuitry is configured to subtract said generated I component and said generated Q component to determine said first noise power estimate for said downlink channel; and said circuitry is configured to square said subtracted I component and said generated Q component to determine said first noise power estimate for said downlink channel.

21. The system according to claim 20, wherein said circuitry is configured to sum said squared I component and said generated Q component over a plurality of TPC symbols to determine said first noise power estimate for said downlink channel wherein said plurality of TPC symbols is one half of said plurality of DPCH TPC bits per slot of said downlink channel.

22. The system according to claim 21, wherein said circuitry is configured to calculate a norm of said summed I component and said generated Q component by dividing said sum of said squared I component and said generated Q component by a number of said plurality of DPCH TPC bits per slot of said downlink channel to determine said first noise power estimate for said downlink channel, and wherein said plurality of TPC symbols is one half of said plurality of DPCH TPC bits per slot of said downlink channel.

23. The system according to claim 14, wherein:

said circuitry is configured to calculate a mean of a plurality of DPCH pilot bits that are received via said downlink channel to yield a mean square estimate; and said circuitry is configured to calculate a mean of a power of said plurality of DPCH pilot bits that are received via said downlink channel to yield a mean power estimate, wherein said circuitry is configured to subtract said mean square estimate from said mean power estimate to determine said second noise power estimate for said downlink channel.

24. The system according to claim 13, wherein said circuitry is configured to adjust transmit power of a transmitter when said transmitter communicates via said downlink channel based on said total noise power estimate.

25. A method comprising:

receiving a plurality of control channel bits via a plurality of different types of control channels;

calculating a first noise power estimate for a downlink channel based on a plurality of dedicated physical channel (DPCH) transmit power control (TPC) bits, wherein a value of at least one of said plurality of DPCH TPC bits is not known, when said at least one of said plurality of DPCH TPC bits is received;

calculating a second noise power estimate for said downlink channel based on a plurality of DPCH pilot bits; and calculating a total noise power estimate for a downlink channel based on said first noise power estimate and said second noise power estimate.

26. A system for signal processing, the system comprising a circuitry configured to:

calculate a first noise power estimate for said downlink channel based on a plurality of dedicated physical channel (DPCH) transmit power control (TPC) bits by summing portions of a plurality of DPCH TPC bits that are received via a downlink channel, to generate an in-phase (I) component and a quadrature (Q) component, and calculate a total noise power estimate for said downlink channel based on said first noise power estimate and a plurality of control channel bits received via a plurality of different types of control channels.

27. A method comprising:

receiving a plurality of control channel bits via a plurality of different types of control channels;

calculating a first noise power estimate for a downlink channel based on a plurality of dedicated physical channel (DPCH) transmit power control (TPC) bits, wherein said calculating said first noise power estimate comprises summing portions of said plurality of DPCH TPC bits that are received via said downlink channel to generate an in-phase (I) component and a quadrature (Q) component;

calculating a second noise power estimate for said downlink channel based on a plurality of DPCH pilot bits; and calculating a total noise power estimate for a downlink channel based on said first noise power estimate and said second noise power estimate.

* * * * *